Feb. 2, 1960 R. DESSAUER ET AL 2,923,827

LIGHT QUANTIZING COMPUTER

Filed Dec. 24, 1957 3 Sheets-Sheet 1

INVENTORS
RALPH DESSAUER
ALAN GROUDAN
BY
Victor D. Borst
ATTORNEY

INVENTORS
RALPH DESSAUER
ALAN GROUDAN
BY
Victor D. Borst
ATTORNEY

LIGHT QUANTIZING COMPUTER

Filed Dec. 24, 1957 3 Sheets-Sheet 3

INVENTORS
RALPH DESSAUER
ALAN GROUDAN
BY
Victor D. Borst
ATTORNEY

United States Patent Office 2,923,827
Patented Feb. 2, 1960

2,923,827

LIGHT QUANTIZING COMPUTER

Ralph Dessauer, Elmhurst, and Alan Groudan, Flushing, N.Y., assignors to Sperry Rand Corporation, Ford Instrument Company Division, Long Island City, N.Y., a corporation of Delaware Application December 24, 1957, Serial No. 705,073

3 Claims. (Cl. 250—208)

This invention relates to a device for determining the color of a scanned line and particularly a light quantizing computer adapted to be used in association with an optical scanner.

One expedient for determining colors on an opaque has been to employ prisms to disperse the light into component colors which are detected by photocells especially sensitized to sense each of the colors. It has also been possible to obtain color content by means of beam splitting. In order to sense the green, red and blue components, for example, a green and a red dichroic mirror are used in tandem. Therefore, one less dichroic mirror is used than the number of colors which are sensed.

This invention comprehends a color computer, some times called a colorimeter, which is adapted to yield voltages selectively to one of a plurality of output lines representing the various colors of which it is desired that the device afford indication. The color representing voltages are generated automatically as a colored opaque material is passed through its optical system. Generally, the color computer comprises a plurality of component color gates with each gate connected to two bi-state devices which are adapted to be operated by color sensitized photocells. The gates serve to generate a pulse when there are introduced a pair of coincident signals representing the particular color falling on its associated photocell and there is an absence of one of the other colors the computer is designed to detect.

Figures 1, 2:
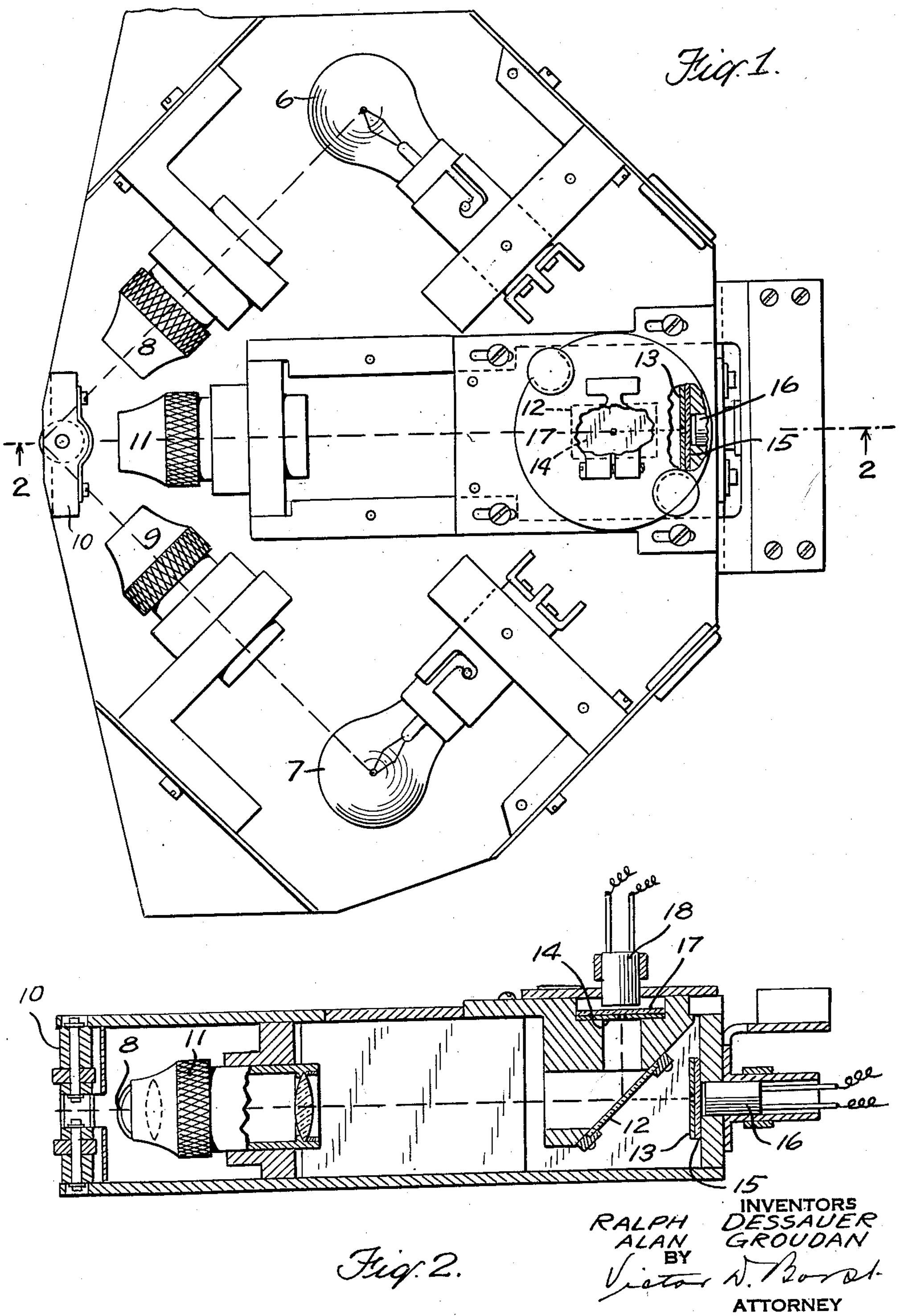
Figure 3:
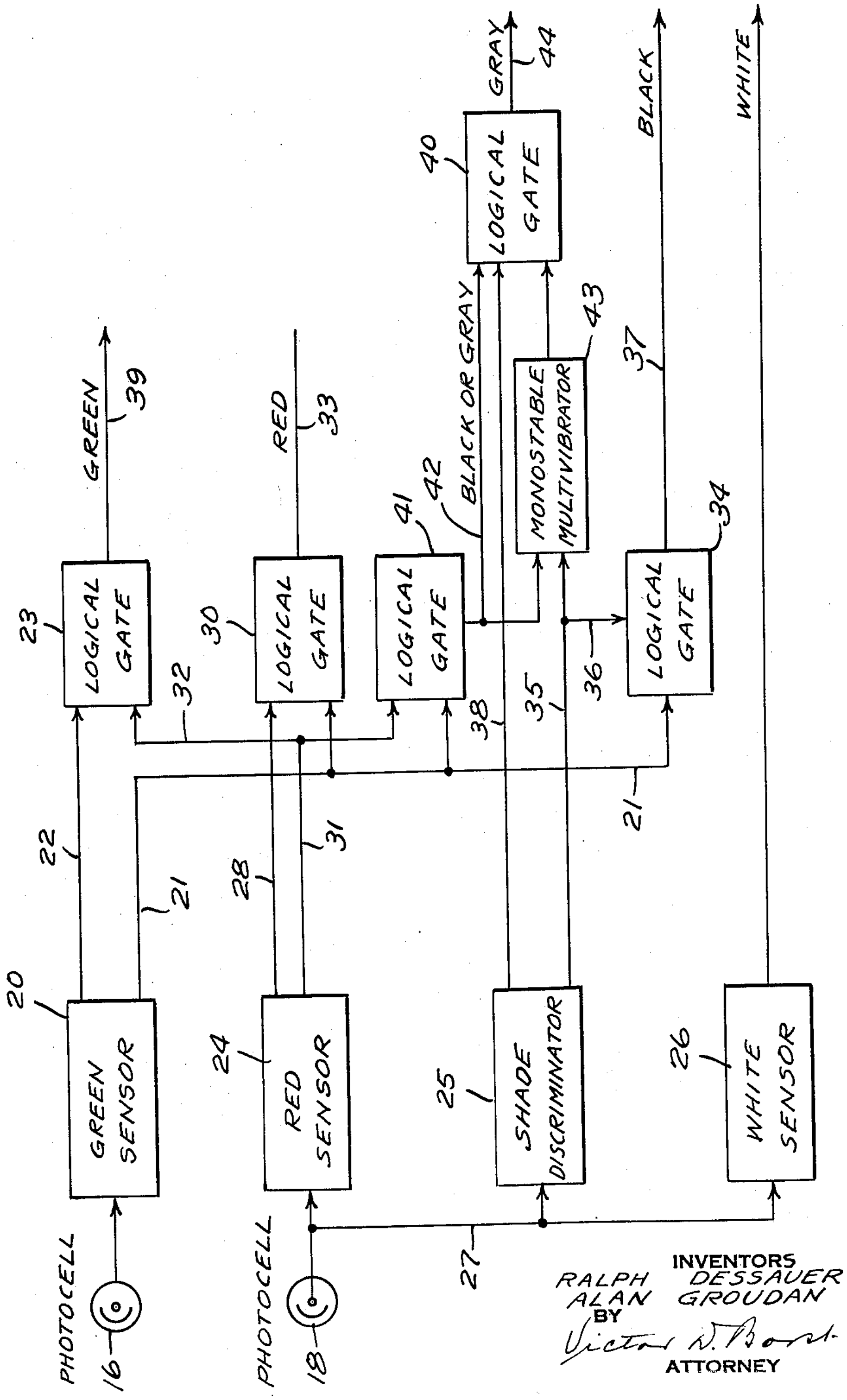
Figure 4:
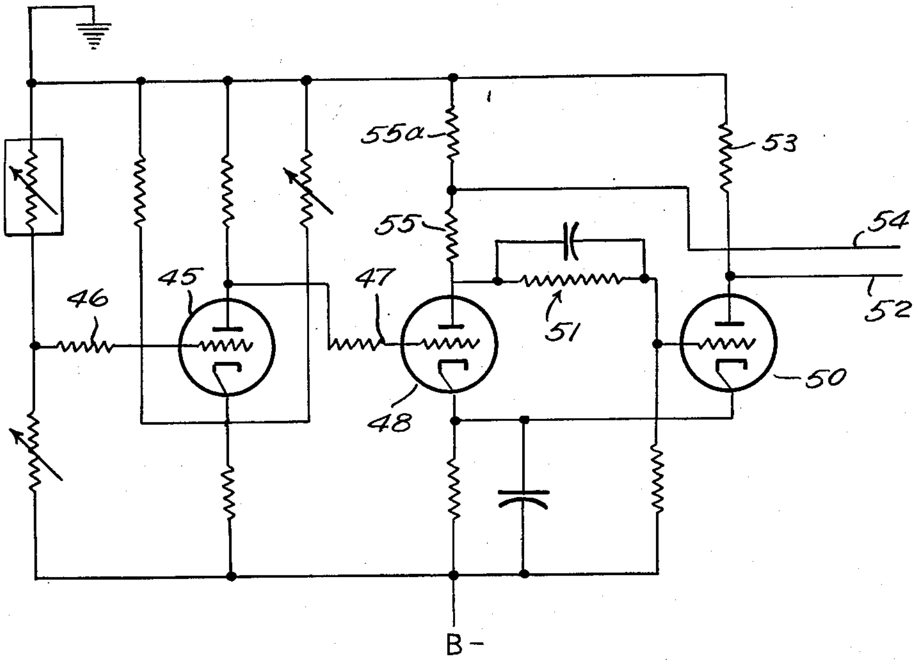
Figure 5:
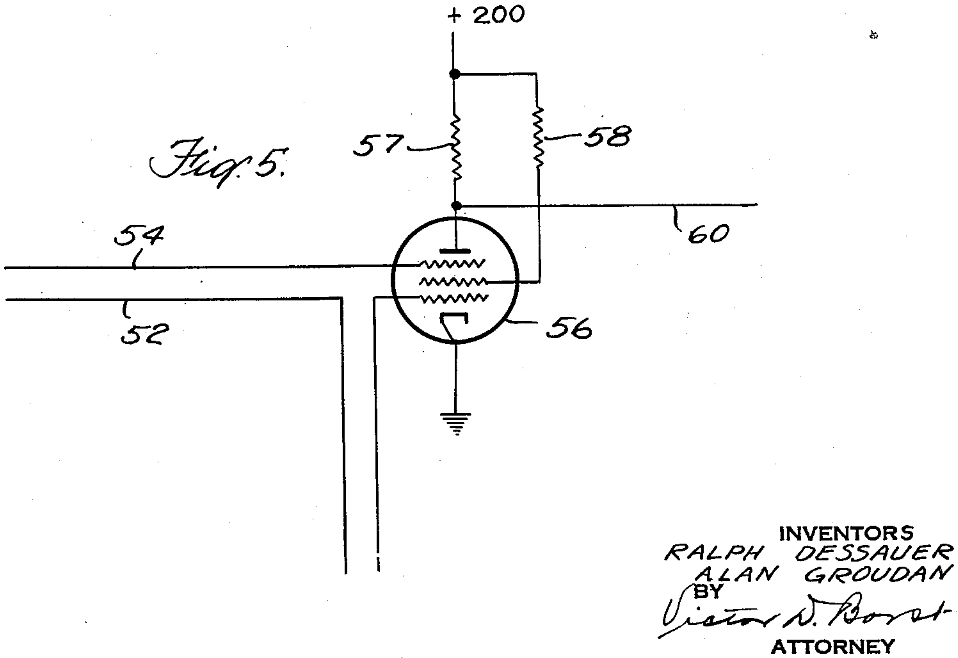

A more detailed understanding of the invention may be gained from the following description of one embodiment which is taken in conjunction with the accompanying drawings, in which Fig. 1 is a plan view of the optical system with certain parts removed, employed to scan for the color computer, Fig. 2 is a sectional view of the optical system taken on line 2—2 of Fig. 1, Fig. 3 is a block diagram showing the operative units of the computer, Fig. 4 is a schematic circuit of the color sensor, and Fig. 5 is a schematic of a gate employed by the color computer.

As shown in Fig. 1, the optical scanner includes two light sources 6 and 7 arranged to pass light through the lens systems 8 and 9, respectively, which serve to focus the light on an opaque member (not shown). The scanner moves across the opaque member by means of roller bearings within aperture block 10. A third lens system 11 is positioned to receive the diffused reflected light and focuses the light on a dichroic mirror 12 which splits the beam and causes one part of the beam by transmission to fall on field stop 13 and the other part by reflection to fall on field stop 14. The field stops can limit the area being scanned to a resolution of .005 inch in diameter. Immediately behind the field stop 13 is a suitable filter 15 and photocell 16 and behind the field stop 14 is a suitable filter 17 and photocell 18. In this particular embodiment, the spectral response of the photocell 16 is peaked for green light and the photocell 18 is peaked for red light and the photocells are adapted to respond at a given instant of time to the color and intensity of the light passed to them by the mirror 12.

Following the computer block diagram of Fig. 3 the photocell 16, which actually will have an output when the color being scanned is white, green or background, is connected to green sensor 20 which is a two-state device, such as a Schmitt trigger circuit, normally adapted to send out its output on line 21 and to feed an output on line 22 to logical gate 23 when an input pulse is received from the photocell 16. The Schmitt trigger circuit is described in "Pulse and Digital Circuits" by Millman and Taub, published by McGraw-Hill Publishing Co., Inc., 1956, pages 164 and 165. Due to the fact that the photocell 16 is peaked for green a high sensor output on line 21 may be said to represent not green and a high output on line 22 to represent green.

The photocell 18 is connected to red sensor 24, shade discriminator 25 and white sensor 26. Lead 27 connects the photocell 18 to the latter two devices. The sensor 24 is connected by line 28 to gate 30 which is also connected by line 21 to the green sensor 20. The logical gate 23 is connected by the lines 31 and 32 to the sensor 24. The line 28 functionally corresponds to the line 22 and will be the high voltage line when the photocell 18 is scanning a color which contains red, such as white, red or background. The lines 31 and 32 are analogous in function to the line 21 and will carry the high voltage output from the sensor 24 when its photocell is not scanning a color which contains red.

The gates require an input of two coincident signals to generate an output. Accordingly, the gate 23 will send out a signal on line 39 only on condition a signal is received on line 22 representing green and a pulse is simultaneously received on line 32 representing not red. Similarly, the gate 30 will generate an output on line 33 only on condition it receives coincident signals on the lines 21 and 28.

The shade discriminator 25 has the same circuit design as the sensors except that it is preset to maintain an output when the color gray strikes the photocell 18. Gray contains sufficient red to actuate the photocell and thereby operate the shade discriminator which is biased to have a more sensitive response to the photocell than the other sensors. Accordingly, the level of the shade discriminator is so set that in addition to white, red and background, the color gray has sufficient red content to maintain the circuit in the red state. However, we shall call this the not black state because it distinguishes black from gray. The discriminator is connected to logical gate 34 by means of lines 35 and lead 36 which carry the high voltage output therefrom when the photocell 18 is scanning colors which contain no red or at least less red than gray contains. Since green also contains no red, the gate 34 is also connected to receive the not green or high voltage on line 21. Consequently, the computer will yield an output representing black on gate line 37 when both photocells are actuated at some instant during the scanning.

On the other hand, if the photocell 18 is actuated sufficiently to enable the discriminator 25 and not the sensor 24 to respond, the color gray is possibly present in the scan causing the discriminator to maintain its state and place the high voltage on line 38 to which logical gate 40 is connected. Because the discriminator would also have this state if red or green were in the scan, a pulse representing not red and not green must concur with the not black signal to eleminate the possibility of these three colors and establish the presence of gray. To this end, logical gate 41 is connected to the not green line 21 and the not red line 31. On coincidence of the pulses from these lines the gate 41 will yield an output representing gray or black on line 42 which together with a not black coincident signal on the line 38 will cause the gate 40 to generate a pulse on its output line 44 representing the color gray.

Because it would be undesirable and lead to inaccuracy if the logical gate 40 should be permitted to yield an output before all the sensors have had a chance to change state, a multivibrator 43 is disposed between the discriminator and the gate 41 and gate 40 to delay the latter's operation. If desired, other delaying or inhibiting means may be associated with any one or all of the other gates.

The sensor 26 is set to respond to the signal on the line 27 when the color white is caused to fall on the photocell 18. Operation of the gates is, of course, precluded since the conditions for their operation will not have been satisfied.

According to the circuit diagram of a sensor as shown in Fig. 4, there is provided a triode 45 which is caused to conduct when a signal on lead 46, as might be produced by a photocell, is placed on its grid. The voltage in its plate circuit 47 is dropped so as to cause the grid of tube 48 of a two-state device to approach or go below cut off. The plate of the tube 48 is tied to the grid of tube 50 by means of coupling network 51 whose impedance is sharply reduced on a sudden change of state in the tube 48. As the tube 48 is cut off the voltage on the grid of tube 50 is increased toward that of the plate supply voltage of the device causing the tube 50 to conduct and the voltage in its load circuit 52 connected between the plate resistor 53 and the electrode to drop. At the same time, the voltage in the other load circuit 54, which is connected between resistors 55 and 55*a* in the plate circuit of the tube 48, will change in the direction of the plate voltage in the same manner as the grid of the tube 50. When there is no operating signal on the grid of tube 45, the voltage levels in the two output circuits 52 and 54 are reversed.

As shown in Fig. 5, a gate comprises a pentode 56 two electrodes of which are biased by the plate voltage placed across resistors 57 and 58. The tube has two electrodes in the nature of control grids being adapted to receive the coincident pulses. When the pulses are simultaneously placed on the grids the tube is caused to operate and generate an output in its output lead 60 which is connected between the resistor 57 and the plate.

Naturally, the invention is not limited to the detection of any particular colors or number of colors. Modifications of the specific embodiment described may be made without departing from the scope of invention as defined in the appended claims.

What is claimed is:

1. A multicolor computer comprising a photocell peaked for the color green and a photocell peaked for the color red, an optical scanner arranged to cast light reflected from a variously colored opaque material on said photocells, a voltage yielding two state device connected to each of said photocells, a pair of gating circuits, each circuit being connected to receive one of the state voltages from one of the two state devices and the other of the state voltages from the other of the two state devices, a third two state device connected to the photocell, which is peaked for the color red, said third two state device having a more sensitive response to the photocell output than the other two state device actuated by said photocell, a third gating circuit connected to receive the other of the state voltages of each two state device, a fourth gating circuit connected to receive one of the state voltages from said third two state device and the output of said third gating circuit, and a fifth gating circuit connected to receive the other of the state voltages of said third two state device and the other of the state voltages from the two state device which is connected to the photocell peaked for the color green.

2. A multicolor computer as claimed in claim 1 wherein a multivibrator is disposed between said third two state device and said fourth gating circuit for the purpose of delaying operation of the latter circuit until the devices have had a chance to change state.

3. A multicolor computer as claimed in claim 2 wherein a fourth two state device is connected directly to one of said photocells, said fourth two state device being directly connected to the output of said computer whereby the computer may yield an output although the light conditions required by the several gating circuits to yield an output are not present.

References Cited in the file of this patent

UNITED STATES PATENTS

| | | |
|---|---|---|
| 2,623,432 | Lange | Dec. 30, 1952 |
| 2,696,750 | Hunter | Dec. 14, 1954 |
| 2,841,640 | Bartelink | July 1, 1958 |
| 2,886,717 | Williamson et al. | May 12, 1959 |